No. 616,513. Patented Dec. 27, 1898.
J. WERTHEIMER.
APPARATUS FOR MAKING OBSERVATIONS BY MEANS OF ROENTGEN OR X-RAYS.
(Application filed Nov. 19, 1897.)
(No Model.) 2 Sheets—Sheet 1.
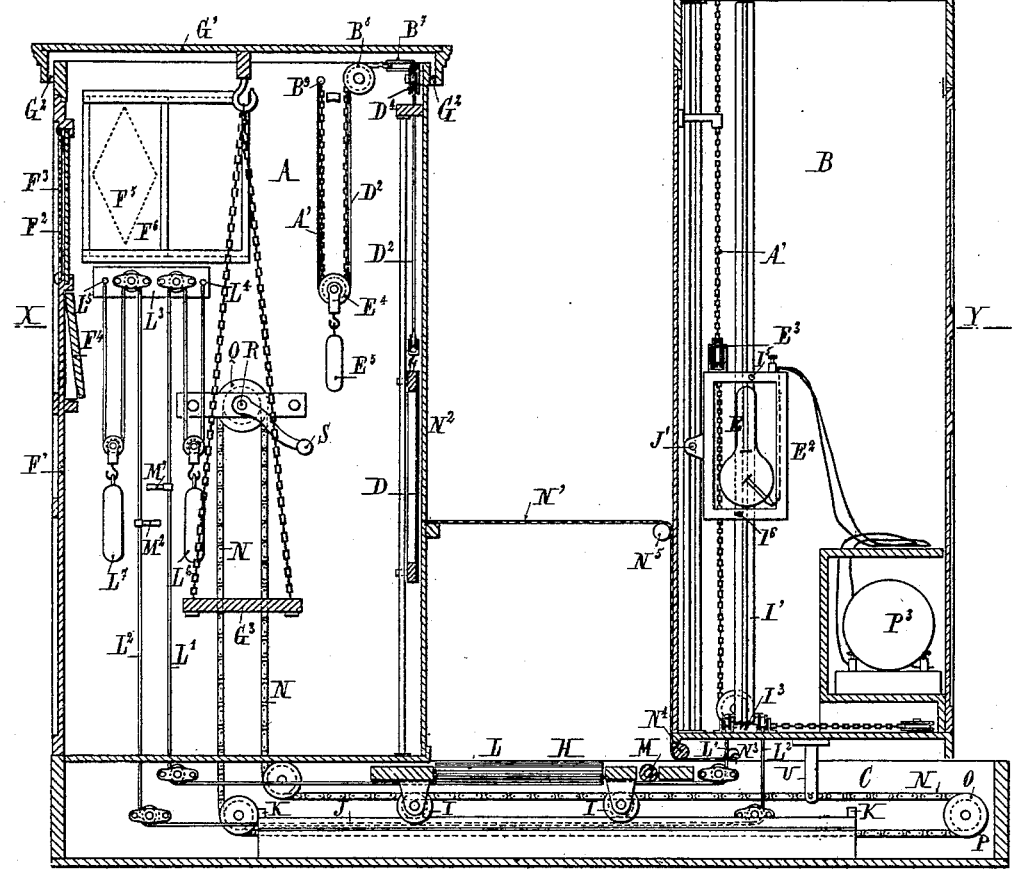
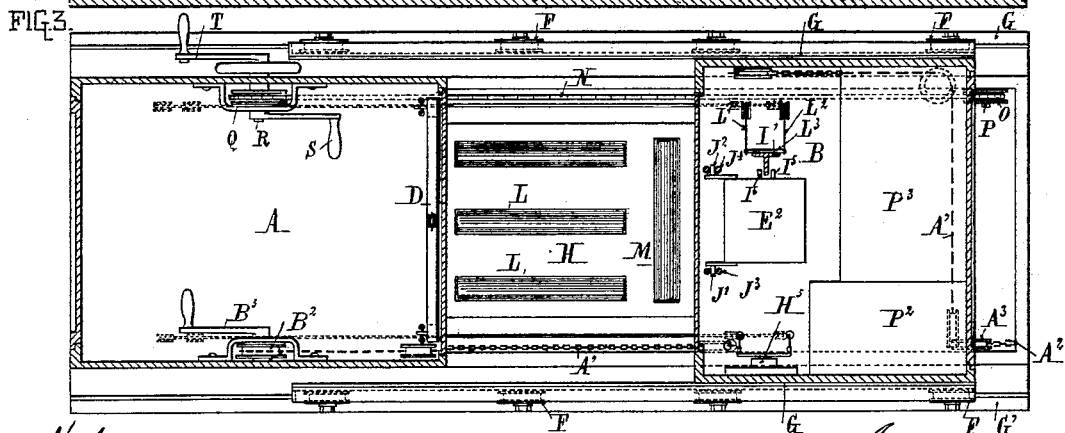
Witnesses:
H. K. Boulter
C. Shontrup
Inventor:
Jacques Wertheimer
By Wm. E. Boulter,
Attorney.

No. 616,513. Patented Dec. 27, 1898.
J. WERTHEIMER.
APPARATUS FOR MAKING OBSERVATIONS BY MEANS OF ROENTGEN OR X-RAYS.
(Application filed Nov. 19, 1897.)
(No Model.) 2 Sheets—Sheet 2.
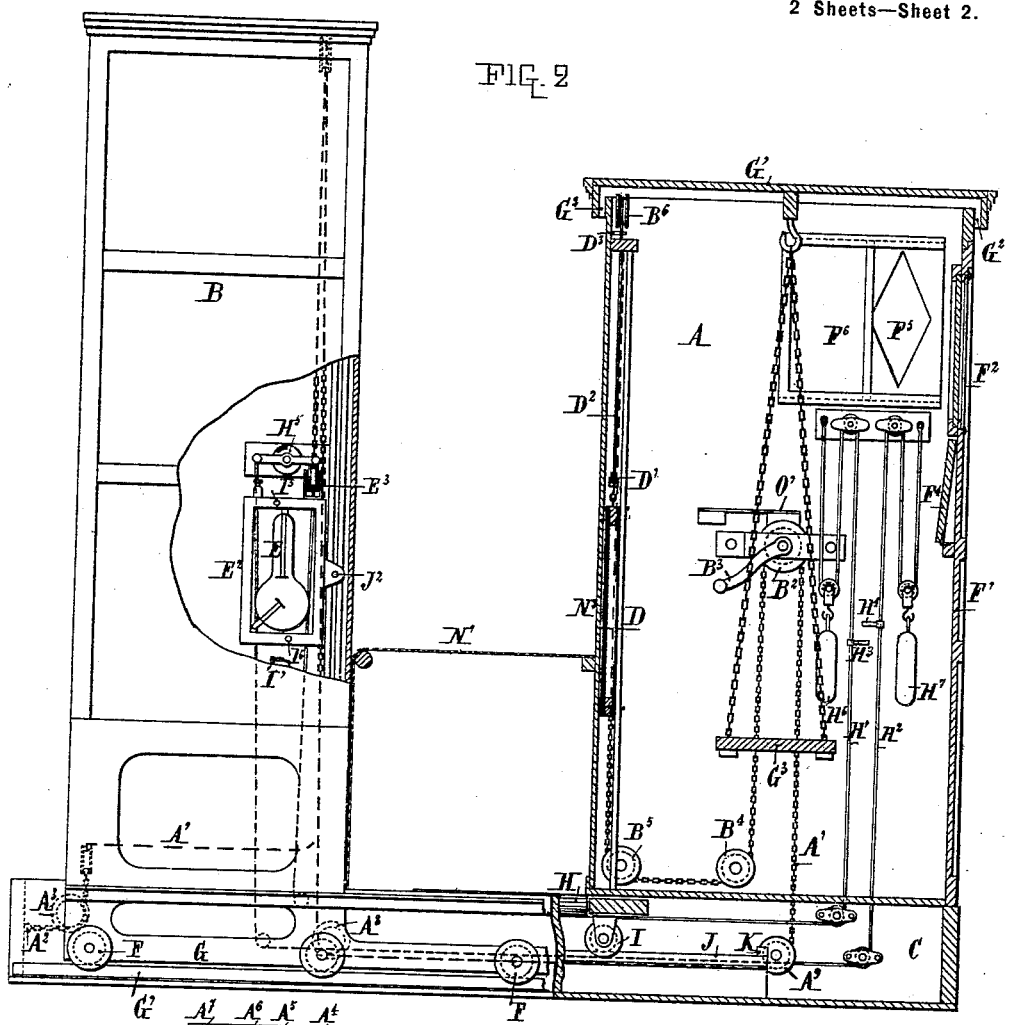
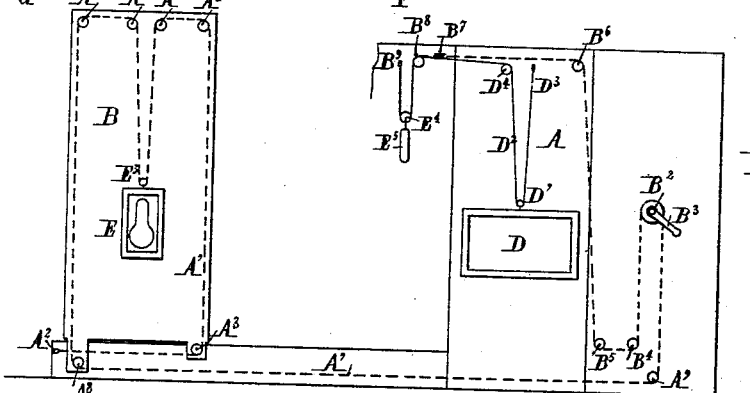

UNITED STATES PATENT OFFICE.

JACQUES WERTHEIMER, OF PARIS, FRANCE.

APPARATUS FOR MAKING OBSERVATIONS BY MEANS OF ROENTGEN OR X RAYS.

SPECIFICATION forming part of Letters Patent No. 616,513, dated December 27, 1898.

Application filed November 19, 1897. Serial No. 659,139. (No model.)

*To all whom it may concern:*

Be it known that I, JACQUES WERTHEIMER, a citizen of the Republic of France, residing at Paris, France, have invented a certain new and useful Improved Apparatus for Making Observations by Means of Roentgen or X Rays, of which the following is a specification.

This invention relates to improvements on the arrangements described in my prior application, Serial No. 646,132, filed July 27, 1897, and has for its object the construction of a simple and practical apparatus for making observations by means of "Roentgen" or "X" rays.

This improved apparatus is shown in the accompanying drawings, in which—

Figure 1 is a front elevation in vertical section seen from the left-hand side. Fig. 2 is a longitudinal front elevation in vertical section seen from the right-hand side, some parts being shown broken away. Fig. 3 is a plan according to Fig. 1 in horizontal section on the line X Y of said figure. These figures are supplemented by a diagrammatic view, Fig. 4, showing the connection of the essential parts in their combined movements.

As may be readily seen from an examination of the figures the apparatus, according to the present invention, comprises two casings A and B, mounted on a common base C. The casing or chamber A, in which the screen D works, is secured at one end of the said base C, while the other casing B, in which the tube or bulb E is placed, may be moved longitudinally on the base toward and from the casing A, as desired. For this purpose the casing B is mounted on rollers F, carried on lateral brackets G, outside of and on each side of the casing B, the said rollers F resting and rolling on corresponding rails G' on the base of the stand C.

Underneath the casings A and B a movable platform H is arranged and moves longitudinally in the base C. This platform is mounted on wheels or rollers I, rolling on rails J, provided with stops K at their ends, these rails being symmetrically arranged in a longitudinal direction in the base C and secured to the latter in any convenient manner. This movable platform H, which is intended to receive the objects to be examined, comprises longitudinal rollers L and transverse rollers M, intended to facilitate the management, positioning, or removal of heavy articles placed on them.

The movement or adjustment of the casing B, which causes its approach to or retirement from the casing A, is produced by an endless chain N and a chain-wheel O, the spindle P of which is secured in the front part of the base C, and a chain-wheel Q, the spindle R of which is secured at a suitable height on the lateral wall of the casing A, the rotation of the said wheel Q in one or in the other direction, as well as the corresponding movement of the chain N inside or outside the casing A being produced by crank-handles S, arranged, preferably, at each end of the spindle R, one outside and the other inside the said casing A.

A fixed rod U, depending from the bottom of the casing B, to which its upper end is secured, is connected by its lower end to the chain N in such a manner as to partake in the movements of the said chain, and consequently to transmit these movements to the casing B, to which it is connected.

In the casing B are arranged the movable bulb or fluorescent tube E, producing the X-rays, the accumulators $P^2$, supplying the electric current to the said bulb, and the transformer $P^3$, inserted in the circuit between the said bulb E and the accumulators $P^2$. In the casing A, as previously stated, the movable screen D is arranged. These two essential parts—namely, the screen D and the bulb E—which are both movable, must move exactly together, so that the rays emitted by the bulb are always exactly projected on the screen at whatever height these two parts happen to be placed. Furthermore, these two parts—namely, the screen and the bulb—should never be affected by the movements of the casing B relatively to the casing A, and the manipulation of the screen and tube must be perfectly independent of the mechanism causing the movement of the casing B. With a view to attaining this object these two parts are connected and operated as hereinafter described and illustrated in Figs. 1, 2, and 3.

The diagrammatic view in Fig. 4 illustrates the arrangement in a more complete manner, the transverse walls, one in front of the casing A and one at the back of the casing B, being both removed in said figure in order to facilitate the understanding of the arrangement.

A chain $A'$, one end of which is secured to a fixed hook $A^2$ on the inner side of the transverse front wall of the base C, passes horizontally under a guide-roller $A^3$, arranged in any desired position on the bottom of the casing B, then passes upward, then again horizontally over rollers $A^4$, $A^5$, $A^6$, $A^7$, and $A^8$ in the casing B, and then passes horizontally along the base C, from whence it enters the casing A and passes around the roller $A^9$, operating-pinion $B^2$, and guide-rollers $B^4$ $B^5$ $B^6$, fixed rollers $B^7$ and $B^8$, and is secured to the fixed point $B^9$, Fig. 4. The operating-pinion $B^2$ is rotated by means of a handle $B^3$, secured to its spindle.

The tube E is arranged in a frame or casing $E^2$, carrying the terminals and its guiding parts, so as to be effectively protected from all shocks by means of a loose pulley $E^3$ on the chain $A'$, between the upper horizontal guide-rollers $A^5$ and $A^6$. On the other hand, the screen D is also suspended by means of a loose roller $D'$ to the portion of the cord or chain $D^2$ between the fixed point of attachment $D^3$ of the latter and a guide-pulley $D^4$, around which said cord is guided, and passes over the roller $B^8$, thence with the chain $A'$ around the roller $E^4$ to their common point of attachment $B^9$, so as to partake in all the movements of the chain. Between the rollers $B^8$ and the point of attachment $B^9$ of the chain $A'$ and cord there is suspended on said chain and cord, by means of a loose roller or pulley $E^4$, a balance-weight $E^5$, the weight of which is greater than that of the screen D, so that while it will always maintain the chain and cord in a taut condition when the chain $A'$ is moved by the pinion $B^2$, so as to raise the tube E, the weight $E^5$ will descend and take up the slack of the chain $A'$, and in so doing will draw down the cord $D^2$ and so raise the screen D to a corresponding degree. Conversely when the pinion $B^2$ is rotated in the opposite direction the chain $A'$ will raise the weight $E^5$, and the cord $D^2$ being thus free from the weight will also be drawn up, owing to the weight of the screen D, which will therefore descend.

Combined with the hereinbefore-described arrangement of the chain $A'$ a brake $O'$ is used, acting on said chain and its driving-pinion $B^2$, as shown in Fig. 2, for the purpose of stopping the said pinion, and consequently insuring the tube E and the screen D being maintained stationary during the movement of the casing B relatively to the casing A. In fact, the result of the action of said brake, which is not strong enough to prevent the pinion $B^2$ from being driven by the handle $B^3$, is that only that part of the chain which is contained in the casing B will move on its guide-rollers during the relative movement of the casings A and B, the portion of said chain from the point of attachment $A^2$ to the point $A^3$ becoming longer if the casing B moves toward the casing A or shorter in case the movement be in the opposite direction, while the reverse takes place for the portion of the chain $A'$ on the side of the roller $A^9$, (from $A^8$ to $A^9$,) said chain $A'$ being on this side prevented from moving by the brake $O'$. The result of such working is, as will be readily understood, for the two portions of the chain $A'$ constituting the means of suspension (by means of the roller $E^3$) of the tube E, the shortening of one and the equal lengthening of the other, according to the direction of movement of the casing B, and consequently the passing of the chain $A'$ around its guide-rollers in the casings B and roller $E^3$, the tube E, as well as the screen D, remaining perfectly stationary.

It will be seen that with the arrangements and combinations described of the chains N and $A'$ the action of one does not in any way interfere with the action of the others and that they work independently of each other, the tension of this chain N operating, the casing B remaining a constant one without any additional device, while the tension of the chain $A'$ is maintained constant by means of a balance-weight $E^5$, compensating for the shortening or lengthening of the operative portion of the chain $A'$ during the ascent or descent of the tube E and screen D.

The operator takes his place in the casing A, which forms a dark chamber, and observes the projections on the screen D. The chamber A may be provided with everything required for the comfort of the operator. This chamber is closed at the back by a door $F'$ with a red-glass window $F^2$, which can be covered by a sliding shutter $F^3$, and a folding table $F''$ may be added. The side walls of the casing are, if desired, provided at suitable height with other windows $F^5$ of red glass with shutters $F^6$. The top or ceiling $G'$ is arranged so as to leave free passage for air at $G^2$ without admitting light from the outside. A movable or swing seat $G^3$ may be suspended to the ceiling or arranged in any other desired manner. The operator thus shut up in the chamber A has within his reach the crank-handles operating the chain N and $A'$, cords $H'$ $H^2$, Fig. 2, with handles $H^3$ $H^4$ for operating the switch $H^5$, arranged in the casing B and effecting the lighting or extinguishing of the tube E. The cords $H'$ $H^2$ are provided with balance-weights $H^6$ $H^7$ for the purpose of maintaining them uniformly taut during the movement of the casing B relatively to the casing A. These weights act in the same manner as the weights $E^5$ of the chain $A'$.

In the casing B the frame $E^2$ of the tube E is guided in its vertical movements by means of two lateral pins $J'$ $J^2$, Fig. 3, symmetrically arranged about the middle of its height and engaging with fixed vertical guides $J^3$ $J^4$.

In order to enable the direction of the projection of the rays from the tube E to be varied, the frame $E^2$, and consequently the tube itself, is capable of oscillating upward or downward to a greater or smaller extent, owing to the double guiding of said frame E², constituted by a vertical bar I', pivoted at either end on vertical pins I² I³, the vertical rib of said bar I' being placed between two stops I⁵ I⁶ on the casing, so that these stops, arranged one above and the other below the guide-pins J' J², by means of which the casing E² is guided in the guides J³ J⁴, in coöperation with the pins J' J², produce the oscillation of the casing E² about the pins J' J² in one or in the other direction by moving the bar I' in a corresponding direction about its pivots. The bar or post I' is turned until one or the other of the pins I⁵ I⁶ will be engaged by the rib of the bar or post I' to cause the oscillation of the frame on the pivots J' J² upwardly or downwardly. The bar is caused to turn to the desired extent and in the desired direction so as to obtain the desired inclination of the tube E by means of cords L' L², attached to either side of a plate L³, Fig. 3, connected to the bar I'. These cords pass over guide-pulleys in the base C and enter the casing A, where they are respectively attached to fixed points L⁴ L⁵ and provided with balance-weights L⁶ L⁷ for maintaining their tension uniform in the same manner as has already been explained with regard to the cords H' H², operating the switch H⁵, whereby their tension is maintained constant whatever be the movement of the casing B relatively to the casing A.

The handles M' M², Fig. 1, arranged at any desired height on the cords L' L², enable the latter to be easily operated by the person in the chamber A.

In order to enable those objects to be conveniently examined which are too small to be placed on the movable platform H, there is arranged between the casings A and B a movable platform N', constituted by a band of fabric or other suitable material of any desired length and width, the ends of which are secured in any desired manner—one outside to the front wall N² of the casing A and the other at N³ on the base C under the casing B, said band passing over transverse rollers N⁴ N⁵, carried by said casing B. The upper roller N⁵ insures the horizontal position of the portion N' of the band which receives the objects to be examined, whereas the lower one N⁴, combined with N⁵, insures the constant tension of said fabric N' whatever be the movements of the casing B relatively to the casing A.

It is obvious that the screen D may be made sufficiently large to make its movement unnecessary if the tube E remains movable. Then the apparatus would comprise a fixed screen and movable tube in combination with the parts described.

The applications of the apparatus according to the present invention are very numerous. Among the most important may be mentioned the use for custom-house purposes, anthropometric purposes, radiography, &c. For all these operations the operator is placed in the casing A and the objects or persons to be examined on the lower platform H or on the upper movable platform N'. The observer can then easily and quickly light or extinguish the tube E by means of the cords H' H², bring the casing B within a desired distance from the casing A by means of the chain N, the object or person to be examined remaining between the two casings, so that the projections on the screen D become very sharp. Then he can raise or lower the tube E and the screen D by means of the chain A' and adjust the position of the tube E by means of the cords L' L², all these operations being, as previously explained, perfectly independent of each other.

For radiographic operations it will be sufficient to arrange between the screen D and the corresponding wall of the casing A a perfectly stretched and fixed sensitive sheet or film, so as to enable a person or object to be radiographed on a single sheet without the necessity of joining sheets together, and this operation to be observed on the screen, which will enable each part to be exposed the desired length of time, leaving the tube and the screen in position for the desired length of time, the times of exposing varying of course according to the thickness and nature of the parts radiographed. In this way a uniformly good radiograph will be obtained.

I claim—

1. In an apparatus of the character described, the combination of two casings, one of which is movable toward and from the other, a vertically-adjustable screen in one casing, and a similarly-adjustable vacuum or fluorescent tube within the other casing, of a flexible support or platform arranged between the casings, the ends of which support have fixed points of attachment and a second support or platform arranged between the casings and below the flexible platform.

2. In an apparatus of the character described, the combination with two casings, one of which is movable toward and from the other, a vertically-adjustable screen within one casing, and a similarly-adjustable vacuum or fluorescent tube within the other casing, of a flexible support or platform arranged between the casings, its ends having fixed points of attachment, and transverse rollers N⁴, N⁵ carried by the movable casing and over which rollers the platform N passes, as described.

3. In an apparatus of the character described, the combination with two casings, one of which is movable toward and from the other, of a chain having fixed points of attachment for its ends, guide-rollers in the movable casing over which said chain passes, a vacuum or fluorescent tube suspended from the said chain within the movable casing, guide-rollers in the fixed casing over which said chain passes, means for operating said chain arranged within the fixed casing, a cord having fixed points of attachment for its ends, a screen suspended from said cord, a roller over which both the rope and chain pass and a weight arranged to maintain a tension upon the rope and chain, all arranged whereby to produce simultaneous adjustment of the screen and tube when the chain is operated, as set forth.

4. In an apparatus of the character described, the combination with two casings, one of which is movable toward and from the other, a vertically-adjustable screen carried by one casing and a similarly-adjustable vacuum or fluorescent tube carried by the other casing, of an endless chain, a chain-wheel O over which said chain passes, a chain-wheel in the fixed casing over which the chain passes, an operating-handle for the latter chain-wheel, guide-rollers for the chain intermediate the chain-wheels, and a rod depending from the movable casing and connected with the chain, as and for the purpose specified.

5. In an apparatus of the character described, the combination with two casings, one of which is movable toward and from the other, a vertically-adjustable screen carried within one casing, and a similarly-adjustable vacuum or fluorescent tube carried within the other casing, of a chain having fixed points of attachment for its ends, and from which chain the tube is suspended, guide-rollers in the movable casing over which said chain passes, a chain-wheel over which the chain passes, a brake acting upon said chain-wheel and chain, a cord having fixed points of attachment for its ends and from which cord the screen is suspended, a roller over which both the cord and chain pass, a weight arranged to maintain a tension on the rope, and chain, an endless chain, a roller over which the latter passes, and a rod depending from the movable casing and connected with the endless chain.

6. In an apparatus of the character described, the combination with two casings one being movable toward and from the other, and a screen carried within one casing, of a frame arranged within the movable casing, a vacuum or fluorescent tube carried by the frame, a vertical post having a rib, and pivoted at its ends upon vertical pivots, and stop-pins carried by the frame and adapted to be engaged by the rib on the post when the latter is turned in the manner and for the purpose set forth.

7. In an apparatus of the character described, the combination with two casings, one being movable toward and from the other, and a screen carried within one casing, of a frame arranged within the movable casing, a vacuum or fluorescent tube carried by the frame, a vertical post having a rib, and pivoted at its ends upon vertical pivots, stop-pins carried by the frame and adapted to be engaged by the rib on the post when the latter is turned, cords connected at one end with the post, extending within the fixed casing, and having fixed points of attachment for their opposite ends, and guide-pulleys over which said cords pass, all arranged and for the purpose specified.

8. In an apparatus of the character described, the combination with two casings, one of which is movable toward and from the other, and a screen carried within one casing and a vacuum or fluorescent tube carried within the other casing, of means for supplying electric current for the tube carried within the movable casing, a switch in the latter casing controlling the lighting of the tube, cords connected at one end with said switch and extending within the fixed casing and having fixed points of attachment for their opposite ends, and weights arranged to exert a tension upon said cords.

In witness whereof I have hereto set my hand in the presence of the two subscribing witnesses.

JACQUES WERTHEIMER.

Witnesses:
LOUIS SULLIGER,
EDWARD P. MACLEAN.